(12) United States Patent
Teichmann et al.

(10) Patent No.: US 11,967,811 B2
(45) Date of Patent: Apr. 23, 2024

(54) CONNECTION SYSTEM

(71) Applicant: BizLink Industry Germany GmbH, Roth (DE)

(72) Inventors: Fred Teichmann, Burk (DE); Helmut Röcki, Pleinfeld (DE)

(73) Assignee: BIZLINK INDUSTRY GERMANY GMBH, Roth (DE)

( * ) Notice: Subject to any disclaimer, the term of this patent is extended or adjusted under 35 U.S.C. 154(b) by 313 days.

(21) Appl. No.: 17/419,946

(22) PCT Filed: Jan. 13, 2020

(86) PCT No.: PCT/EP2020/000005
§ 371 (c)(1),
(2) Date: Jun. 30, 2021

(87) PCT Pub. No.: WO2020/156749
PCT Pub. Date: Aug. 6, 2020

(65) Prior Publication Data
US 2022/0069558 A1    Mar. 3, 2022

(30) Foreign Application Priority Data

Jan. 30, 2019    (DE) .......................... 102019000651.8

(51) Int. Cl.
| | |
|---|---|
| *F16L 21/00* | (2006.01) |
| *F16L 21/02* | (2006.01) |
| *G02B 6/38* | (2006.01) |
| *H02G 3/04* | (2006.01) |

(Continued)

(52) U.S. Cl.
CPC ............ *H02G 3/0616* (2013.01); *F16L 21/02* (2013.01); *G02B 6/3897* (2013.01); *H02G 3/0462* (2013.01); *H02G 15/013* (2013.01)

(58) Field of Classification Search
CPC ........... F16L 39/00; F16L 21/02; H02G 11/00
See application file for complete search history.

(56) References Cited

U.S. PATENT DOCUMENTS

| | | | | |
|---|---|---|---|---|
| 2,438,679 A | * | 3/1948 | Parker .................... | F16L 39/00 |
| | | | | 285/124.2 |
| 3,305,249 A | * | 2/1967 | Zahuranec ............. | F16L 39/00 |
| | | | | 285/379 |

(Continued)

FOREIGN PATENT DOCUMENTS

| | | |
|---|---|---|
| DE | 2523364 A1 | 1/1976 |
| GB | 1219766 A * | 1/1971 |

OTHER PUBLICATIONS

Leoni Kabel GMBH, CN Office Action for corresponding CN Patent Application No. 202080010775.0, dated Jul. 19, 2022, pp. 1-15.

*Primary Examiner* — Zachary T Dragicevich
*Assistant Examiner* — James A Linford
(74) *Attorney, Agent, or Firm* — Tarolli, Sundheim, Covell & Tummino, LLP

(57) ABSTRACT

A first connection element, a second connection element, and a linking element are provided to link two devices. The linking element includes an inner element and an outer element that surrounds the inner element. The first connection element and the second connection element have respective coupling elements. The respective coupling elements connect the first connection element and the second connection element to the linking element.

17 Claims, 2 Drawing Sheets

(51) Int. Cl.
*H02G 3/06* (2006.01)
*H02G 15/013* (2006.01)

(56) References Cited

U.S. PATENT DOCUMENTS

| | | | | |
|---|---|---|---|---|
| 4,692,561 A | * | 9/1987 | Nattel | H02G 15/013 |
| | | | | 174/653 |
| 2011/0259637 A1 | * | 10/2011 | Winship | H02G 15/013 |
| | | | | 174/650 |
| 2012/0205498 A1 | | 8/2012 | Komiya | |
| 2012/0228437 A1 | | 9/2012 | Komiya et al. | |
| 2015/0155079 A1 | * | 6/2015 | Martins Neto | H02G 15/013 |
| | | | | 174/153 R |

* cited by examiner

CONNECTION SYSTEM

RELATED APPLICATIONS

The present invention is a U.S. National Stage under 35 USC 371 patent application, claiming priority to Serial No. PCT/EP2020/000005, filed on 13 Jan. 2020; which claims priority of DE 102019000651.8, filed on 30 Jan. 2019, the entirety of both of which are incorporated herein by reference.

The invention is directed to a connection system consisting of a first connection element and a second connection element, as well as a linking element which links the first connection element and the second connection element to one another.

Such connection systems are required in order to link technical devices to one another and thus enable a transfer of data and energy between the technical devices. Different technical demands are placed on the connection system depending on the specific application, environmental conditions and technical requirements for the technical devices.

PRIOR ART

In various connection systems known from the prior art, for example, connection elements are known which are designed as plug-in connectors. By making contact with corresponding mating plug-in connectors on the technical devices, a connecting link between the technical devices is made possible. Specific applications may be in industry, medicine or also in the end-customer sector. The link in this case may be flexible or rigid, protected against environmental influences or designed to be vibration-proof.

In the known connection systems, a cable which carries electrical and/or optical lines and/or fluid lines is usually attached to plug-in connectors by means of cable screw connections. These cable screw connections consist of an elastically deformable ring, which surrounds the cable and is pressed against it by means of a mechanical device, thus creating a mechanical link. The disadvantage of such cable screw connections is that they are very difficult to produce in an environmentally sealed manner. The experience of the user depends on whether the screw connection is either too tight, which would damage the cable, or whether the screw connection is too loose, which means that it is not possible to produce an environmentally-sealed link. It is hardly possible for the user to find the correct point for a secure screw connection.

Another solution known from the prior art is not implemented by a cable screw connection, but by encapsulating the cable end in the plug-in connector. In this case, an open end of the cable is placed in a chamber on the plug-in connector and encapsulated with a curing compound. The disadvantage here is that this link is very inflexible. Such a link can only be produced once. To release link, at least the encapsulation, if not the entire cable end and the plug-in connector, must be destroyed.

All the solutions known from the prior art have in common the disadvantage that the entire cable, including all the components and lines located therein, are fixed to the plug-in connector. This is particularly disadvantageous when the components and lines exhibit different elasticities and tensile strengths. For example, glass fiber lines have a lower tensile strength limit than copper lines or fully elastic fluid lines, which may be stretched very far. The use of lines having very different moduli of elasticity is particularly problematic.

When a tensile force is exerted on the line, this may result in individual lines only being stretched, while other lines exceed their yield point and experience an undesired, plastic deformation or even tear. This may occur, in particular, when the line is loaded at the plug-in connectors and tension is thus exerted on the cable and on the internal lines at the cable attachment.

Problem Definition

The object of the present invention is to introduce a connection system which overcomes the disadvantages of the connection systems known from the prior art. At the same time, the connection system should be easy to assemble, flexible and quick to use, as well as cost-effective, and an overloading of elements should be avoided.

The object is achieved by the connection system according to the invention of claim 1, consisting of at least one first connection element and one second connection element, as well as a linking element, wherein the linking element consists of at least one inner element and one outer element surrounding the inner element, and wherein the linking element links the first connection element and the second connection element.

Advantageous embodiments of the invention are specified in the subclaims.

The invention is a connection system consisting of a first connection element and a second connection element. The first connection element and the second connection element are linked to one another via a linking element. The linking element consists of an inner element and an outer element. The outer element in this case is designed as an elongated element. The inner element, which is also designed as an elongated element, is surrounded by the outer element and accommodated therein. The outer element functions primarily to protect the inner element.

One preferred embodiment provides for the outer element to be designed as a cable jacket or sheath. This embodiment known from the prior art enables particularly good protection against external influences such as moisture, dirt or the effect of force with blunt or pointed objects.

In one particularly advantageous embodiment, the inner element is arranged to be freely movable in the outer element. This means that the inner element is able to move flexibly laterally and/or along the length of the elongated elements in the outer element.

Another embodiment according to the invention provides that the inner element is designed as at least one line. In one expedient embodiment, the inner element is formed from multiple different lines. The lines are preferably provided for transmitting energy and data.

Accordingly, appropriate lines are provided which are suitable for transmitting energy and data. These are preferably electrical lines for transmitting electrical energy or electrical signals and data, optical lines for transmitting optical signals and data, but also radiation, and fluid lines for transmitting flowable media and, for example, thermal energy.

In one preferred embodiment of the invention, the different lines of the inner conductor differ in their mechanical properties. A different modulus of elasticity of the individual lines is of particular advantage here. This is particularly advantageous if the properties are combined in such a way that a line exhibits a particularly high modulus of elasticity. This ensures that this one line is able to absorb a particularly large amount of tensile force. Other lines having a lower modulus of elasticity may thus be protected and deformation due to stretching beyond the linear-elastic behavior of the lines may be prevented.

Such an expedient combination of lines means that the linking element may also have filigree elements and lines not subjectable to high mechanical loads. Damage to these lines as a result of external mechanical influences, especially tensile forces on the connection system, may thus be minimized or even eliminated by absorption of the force from the line having the highest modulus of elasticity.

One specific embodiment of the invention provides that the modulus of elasticity of the outer element is lower than the modulus of elasticity of at least one of the lines of the inner element. This may ensure that the outer element, i.e. the jacket of the system, is not forced to absorb any tensile forces. This is particularly advantageous when a jacket having high mechanical transverse stability is provided. That is, a jacket that is able to absorb high transverse forces, but barely any longitudinal forces.

In order to enable a force transfer to one of the lines, a further embodiment provides that at least one of the lines is force-fittingly connected to the first connection element and to the second connection element. It is thus possible for a force, which acts on one of the connection elements, to be transferred to the linking element and to the further connection element. A force that acts directly on the linking element may also be transferred and diverted to one of the connecting elements.

One preferred embodiment provides that the force is transferred from the first connection element to the second connection element via the line having the greatest modulus of elasticity. This means that at least the line having the greatest modulus of elasticity has a mechanically force-fitting connection with both the first connection element and with the second connection element. This may ensure that any occurring tensile force is always transferred via the line that experiences the least stretching. All other lines are therefore not stretched beyond their elongation limit.

In one further embodiment, coupling elements are provided which enable the connection between the linking element and the first connection element as well as the connection between the linking element and the second connection element. The coupling elements in this case are designed in such a way that they are suitable for a force-fitting connection between the linking element and the connection element. At the same time, the coupling elements represent an environmentally-sealed connection between the connection elements and the linking element.

One expedient embodiment provides that the coupling element consists of an elastically deformable material. A polymer that is designed as a pinch seal, for example, is preferably suitable for this purpose. The coupling element in this case is clamped and pressed on the connection element, while the connection elements are accommodated on or in the coupling element.

The coupling element preferably has at least one through-opening for accommodating the at least one line of the inner element. In the opening, a radial sealing surface acts on the line and thus creates an environmentally-sealed, force-fitting connection.

In one further embodiment, the coupling element also has at least one axial sealing surface for connecting the outer element to the linking element. At this axial sealing surface, the outer element may be pressed onto the coupling element, for example via a flange.

According to the invention, the coupling element has the same number of openings as the inner element has lines. One each of the lines is accommodated in one of the openings. One particular embodiment of the invention provides that the lines in the openings have different frictional connections. This means that the line having the greatest modulus of elasticity also has the greatest mechanical frictional connection in the coupling element. This connection according to the invention of the lines to the coupling element ensures that any axial tensile force occurring along the connection system is always absorbed by the line having the greatest modulus of elasticity. Damage to the other lines and to the outer element may thus be prevented.

In order to enable a possible environmentally-sealed connection of the outer element to the coupling element, a flange is provided in one specific embodiment of the invention at the ends of the outer element. This may be pressed on or pressed in, glued or attached to the outer element in another manner known from the prior art. By using a flange, the outer element may easily be attached and held on the connection element, for example by means of a union nut or an undercut. At the same time, the flange may abut an axial sealing surface on the coupling element and here ensure an environmentally-sealed connection between the outer element and the connection element by means of a sufficient pressure force.

The object of the present invention is achieved in a particularly advantageous manner by the embodiments cited in the invention. The invention enables an environmentally-sealed connection of two connection elements. At the same time, a force transfer from the first connection element to the second connection element is ensured without lines of the inner element being harmed or damaged in the process. The invention provides a consistently secure force transfer from the first connection element to the second connection element, without impairing lines or the outer element.

EXEMPLARY EMBODIMENT

Exemplary embodiments of the invention are shown in the drawings and are explained in greater detail below. Therein:

Figure 1:
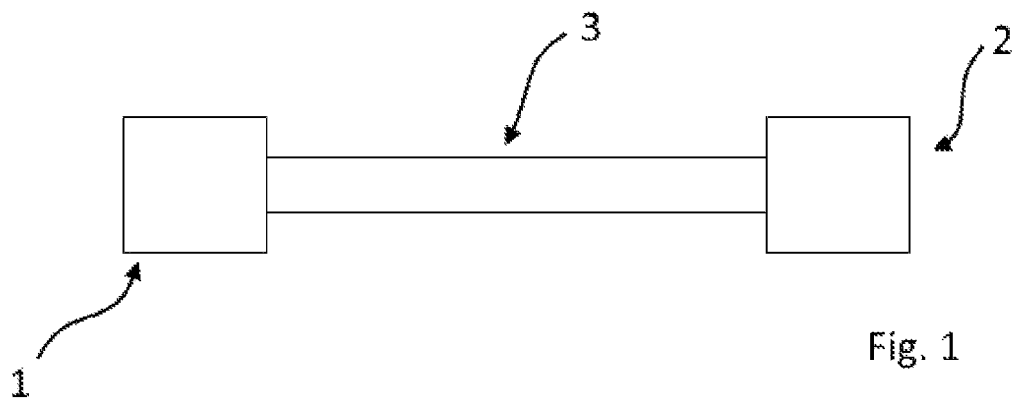
FIG. 1 shows a connection system according to the invention in a functional representation.

FIG. 1 shows a functional representation of a connection system according to the invention. The connection system essentially consists of a first connection element 1, a second connection element 2 and a linking element 3. The linking element 3 in this case is designed as an elongated element. The linking element 3 may preferably be a cable, cable-sheath assembly or the like.

The linking element 3 has two opposite ends, each of which are connected to one of the connection elements 1, 2. The connection elements 1, 2 are preferably designed as, for example, plug-in connectors, cable ends or junction boxes. The linking element 3 in this case is connected to the first connection element 1 and to the second connection element 2 and is in contact with them.

Contact elements provided in the connection elements 1, 2 are provided for further contacting and transfer. The connection system in this case is provided for transmitting signals, data and energy. Electrical signals and/or energy, optical signals and/or energy and/or a fluid flow may be transmitted depending on the packaging.

Figure 2:
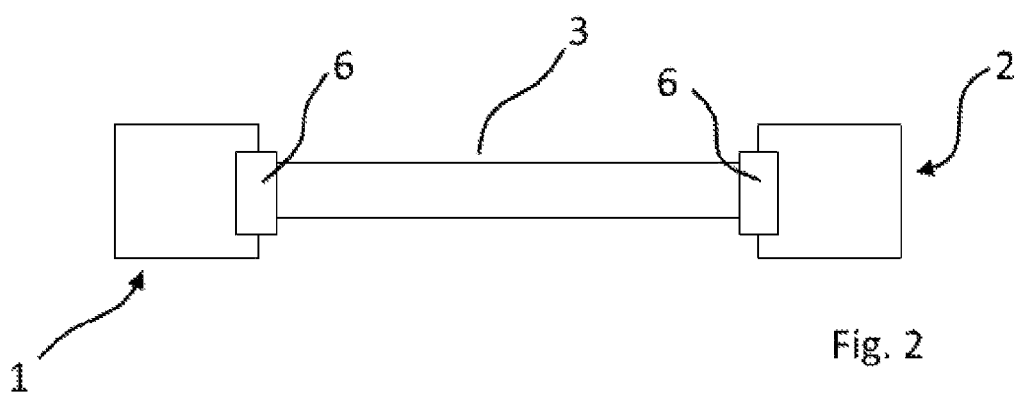
FIG. 2 shows a further connection system according to the invention in a functional representation.

Another connection system according to the invention as a functional representation is shown in FIG. 2. In addition to the connection system shown in FIG. 1, this other connection system also has two coupling elements 6. The coupling elements 6 are provided between the first connection element 1 and the linking element 3 as well as between the second connection element 2 and the linking element 3.

The coupling elements 6 in this case are designed as a link between the linking element 3 and the first connection element 1 and the second connection element 2. The coupling elements 6 establish both the mechanical connection and an environmentally-sealed connection.

Figure 3:
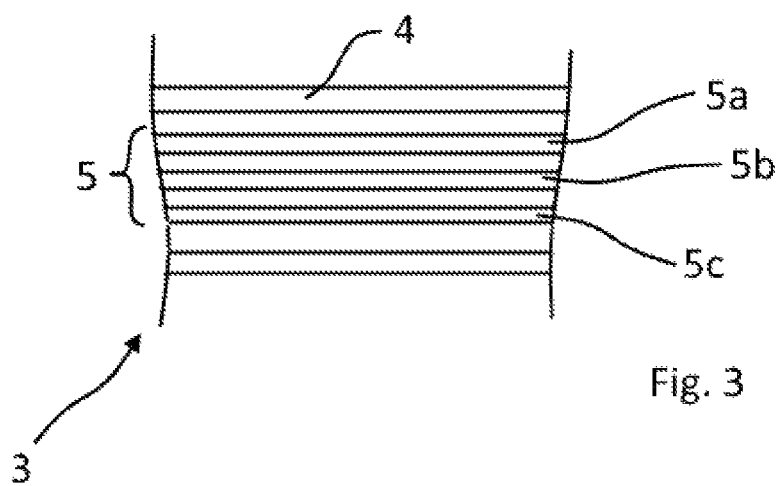
FIG. 3 shows a detailed representation of a linking element according to the invention in section.

FIG. 3 shows a linking element 3 according to the invention as a detailed view in section. The linking element 3 consists of an outer element 4 and an inner element 5. The inner element 5 in this case is arranged to be freely movable in the outer element 4 and is completely surrounded by the latter.

The inner element 5 is formed from three lines 5a, 5b, 5c. The three lines 5a, 5b, 5c are arranged in the outer element 4 and are freely movable therein. The line 5a is an electrical line for transmitting electrical signals, data and energy. The line 5b is designed as an optical line for transmitting optical signals, data and energy. The line 5c designed as a fluid line is provided for transmitting flowable media.

Figure 4:
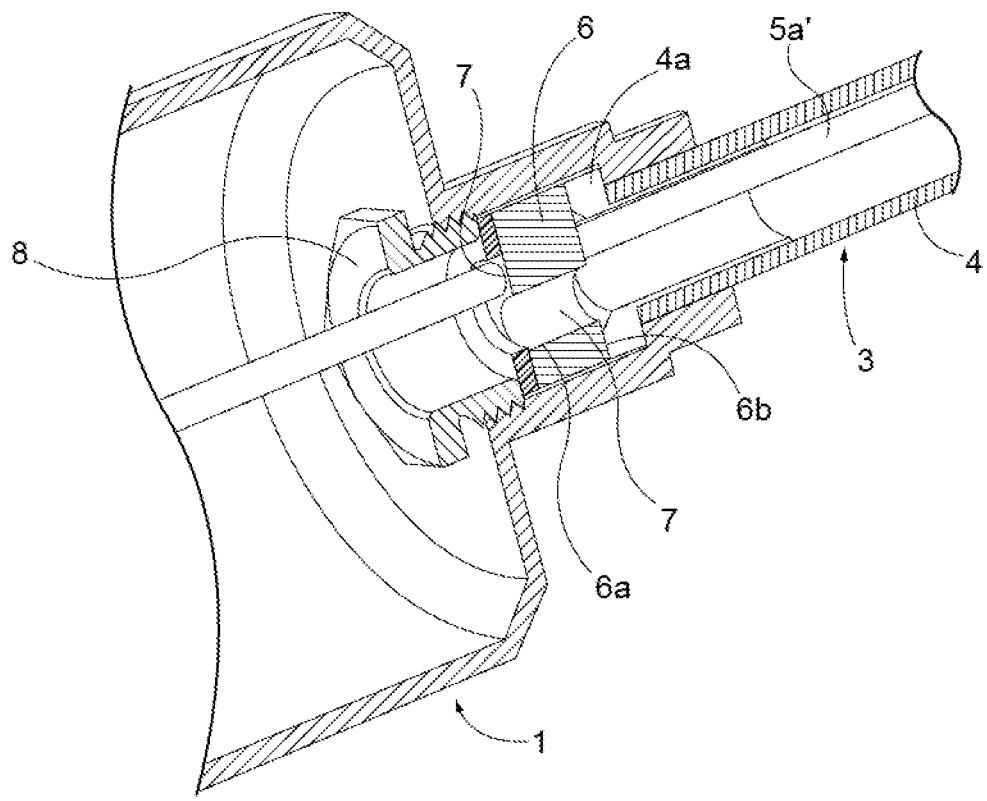
FIG. 4 shows a sectional view of a connecting element according to the invention with a connected linking element.

FIG. 4 shows a sectional representation of a connection element 1 according to the invention with a connected linking element 3. The linking element 3, shown in the right-hand area, is guided with the end shown into a receptacle of the connecting element 1. For the sake of clarity, only one line 5a' of the inner element 5 of the linking element 3 is shown. The line 5a' is also the line according to the invention having the greatest modulus of elasticity compared to the other lines 5b, 5c, not shown.

The outer element 4 of the connecting element 3 is designed as a sheath. The lines 5a' and 5b and 5c (not shown) are accommodated in the outer element 4. A flange 4a is provided on the outer element 4 axially at the end of the outer element 4. The flange 4a has a sleeve, which is inserted into the free end of the outer element 4 and is firmly connected to the outer element 4.

The flange 4a is designed in such a way that it is held at a taper in the connection element 1. On the side facing away from the linking element 3, the flange 4a has a surface, which is designed for environmentally-sealed contact with the coupling element 6.

A coupling element 6 is arranged on the side of the flange 4a facing away from the linking element 3. The circular coupling element 6 has two openings 7 shown here. In this case, the line 5a' is accommodated in the one opening 7, only half of the second opening 7 being shown in section.

The coupling element 6 is pressed onto the flange 4a by means of a screw connection 8 on the connection element 1. As a result of the pressing, the coupling element 6 is compressed, as a result of which a radial deformation of the coupling element 6 is simultaneously produced. This radial deformation ensures a force-fitting connection of the line 5a' in the opening 7. As a result of the pressing of the coupling element 6 against the flange 4a between the coupling element 6 and the flange 4a, an environmentally-sealed connection is simultaneously produced.

The advantage of the invention according to the invention is that, as a result of lines 5a, 5b, 5c having different moduli of elasticity, the entire axial force acting on the connection system may be absorbed by a line 5a'. By appropriately designing the diameter of the openings 7, it may thus be ensured that the line 5a' transfers the greatest force onto the coupling element 6. This ensures that sensitive lines 5a, 5b, 5c are unable to be overstretched, unduly stretched or damaged.

LIST OF REFERENCE NUMERALS

1 First connection element
2 Second connection element
3 Linking element
4 Outer element
4a Flange
5 Interior element
5a Electrical line
5b Optical line
5c Fluid line
6 Coupling element
6a Radial sealing surface
6b Axial sealing surface
7 Opening

The invention claimed is:

1. A connection system, comprising a first connection element, a second connection element, and a linking element, wherein the linking element includes at least one inner element and one outer element surrounding the inner element, and wherein the linking element links the first connection element and the second connection element, wherein the first connection element and the second connection element each have a coupling element of a set of coupling elements,
   wherein the coupling element connects the first connection element and the second connection element in each case to the linking element,
   wherein radial sealing surfaces and axial sealing surfaces are formed on the coupling element,
   wherein the outer element of the linking element is provided one flange each at two ends, the flange being in environmentally-sealed contact with the axial sealing surface of the coupling element,
   wherein each coupling element of the set of coupling elements is pressed against the respective flange with the axial sealing surface, so that a radial deformation of the coupling element is simultaneously produced.

2. The connection system according to claim 1, wherein the inner element includes one or more lines, and wherein a line of the one or more lines is configured for transmitting data or energy.

3. The connection system according to claim 2, wherein the line of the one or more lines is an electrical line or an optical line or a fluid line.

4. The connection system according to claim 2, wherein the one or more lines include a plurality of lines having different moduli of elasticity.

5. The connection system according to claim 4, wherein the outer element has a lower modulus of elasticity than at least one of the lines of the one or more lines.

6. The connection system according to claim 2, wherein at least one of the lines of the one or more lines is force-fittingly connected to the first connection element and to the second connection element.

7. The connection system according to claim 6, wherein the at least one of the lines is designed to transfer a force between the first connection element and the second connection element and has a higher modulus of elasticity than remaining lines of the one or more lines.

8. The connection system according to claim 2, wherein the one or more lines and the radial sealing surfaces of the coupling element are in environmentally-sealed contact.

9. The connection system according to claim 1, wherein coupling elements of the set of coupling elements are designed for sealing the first connection element or the second connection element to the linking element in an environmentally-sealed manner, and wherein the coupling elements are designed for transferring force from the first connection element or the second connection element to the linking element.

10. The connection system according to claim 1, wherein the coupling elements are made of an elastically deformable material.

11. The connection system according to claim 10, wherein the coupling elements are made of a polymer.

12. The connection system according to claim 1, wherein the coupling element is designed as a flat seal, and wherein the coupling element has at least one opening.

13. The connection system according to claim 12, wherein the inner element is accommodated in the opening of the coupling element.

14. The connection system according to claim 12, wherein the inner element includes one or more lines accommodated in one of the at least one opening of the coupling element.

15. The connection system according to claim 14, wherein the one or more lines are accommodated in the openings in an environmentally-sealed manner and at least one of the lines of the one or more lines is force-fittingly accommodated in one of the openings.

16. The connection system according to claim 15, wherein a line of the one or more lines has a higher frictional connection to the coupling element than other lines the one or more lines, and wherein the line has the greatest modulus of elasticity compared to the other lines.

17. The connection system according to claim 1, wherein the inner element is accommodated in the outer element in a freely movable manner.

\* \* \* \* \*